United States Patent [19]
Richmond

[11] Patent Number: 5,381,292
[45] Date of Patent: Jan. 10, 1995

[54] METHOD FOR SELF-CLEANING DAT DRIVE TAPE HEADS

[75] Inventor: Robert C. Richmond, Laguna Hills, Calif.

[73] Assignee: Archive Corporation, Costa Mesa, Calif.

[21] Appl. No.: 90,972

[22] Filed: Jul. 13, 1993

Related U.S. Application Data

[62] Division of Ser. No. 679,668, Apr. 3, 1991, Pat. No. 5,253,126.

[51] Int. Cl.$^6$ ............................................. G11B 5/10
[52] U.S. Cl. ...................................... 360/128; 360/71
[58] Field of Search .................................. 360/128, 71

[56] References Cited

U.S. PATENT DOCUMENTS 4,631,479 12/1986 Haga ................................. 360/31 X Primary Examiner—A. J. Heinz
Attorney, Agent, or Firm—Fliesler, Dubb, Meyer & Lovejoy

[57] ABSTRACT

A method for monitoring the performance of a DAT drive and a method for self-cleaning the tape heads of a DAT drive pursuant to the occurrence of an error that could not be corrected by re-reads or re-writes. The monitoring method includes the steps of (a) reading a tape, (b) determining for each of successive groups of frames respective A track and B track reference error counts representative of the A track and B track C1 error counts in each group of frames, each group having the same number of frames, and (c) providing a warning signal indicative of degraded performance if (i) either the A track reference counts for a predetermined number of consecutive frame groups exceed a predetermined threshold or the B track reference counts for a predetermined number of consecutive frame groups exceed a predetermined threshold, or (ii) if both the A track and B track reference counts for the predetermined number of consecutive frame groups exceed the predetermined threshold. The self-clean procedure includes the steps of moving the tape to the end of the tape at a speed higher than normal, moving the tape to the beginning of the tape at a speed higher than normal, positioning the tape at the location of the error, providing a warning to the user, and resuming the operation that resulted in occurrence of the error. If the error persists, the user is notified of the occurrence of an uncorrectable error.

13 Claims, 4 Drawing Sheets

INDIVIDUAL TRACK FORMAT

METHOD FOR SELF-CLEANING DAT DRIVE TAPE HEADS

This is a divisional of U.S. application Ser. No. 07/679,668, filed Apr. 3, 1991, now U.S. Pat. No. 5,253,126.

BACKGROUND OF THE INVENTION

The disclosed invention is directed generally to computer storage digital audio tape (DAT) drives, and is directed more particularly to techniques for monitoring read error rates to provide early indications of degrading tape or dirty tape heads before an unrecoverable error occurs, and to a technique for cleaning the tape heads of a DAT drive pursuant to occurrence of an error that could not be corrected by re-reads or re-writes.

Digital audio tape (DAT) technology, which was developed for audio programming as defined in the DAT Conference Standard, DIGITAL AUDIO TAPERECORDER, June 1987, published by the Electronic Industries Association of Japan, has been adapted for storage of computer data. An example of a format for the storage of computer data utilizing DAT technology is the American National Standards Instituted (ANSI) Digital Data Storage (DDS) standard, presently in draft form ("PROPOSED AMERICAN NATIONAL STANDARD HELICAL-SCAN DIGITAL COMPUTER TAPE CARTRIDGE 381 mm (0.150 in) FOR INFORMATION INTERCHANGE," ASC X3 Project No. 668-D).

The characteristics that have made DAT technology attractive for computer data storage include high capacity, high transfer rate capability, relatively small media size and low media cost, and the adaptability of DAT technology to conform with personal computer storage device form factors including the 5¼ and 3½ inch forms.

The use of DAT technology for storage of computer data can be achieved by application of a data storage format, such as the above-referenced ANSI DDS standard, to the DAT Conference audio standard. In particular, the DAT audio standard physical track format is retained, but the contents of the information stored in the tracks is in accordance with the computer data storage format.

The storage media in DAT technology is magnetic tape that is moved relative to tape heads, tape guides, and so forth, and like most tapes is subject to wear with increased use. A worn tape is unreliable and should be replaced. A consideration with tape wear and deterioration is determining when a tape should be replaced. Ideally, a tape should be replaced before tape wear causes difficulties in writing and/or retrieving data from the tape.

One attempt to provide information indicative of tape deterioration has been the DDS format definition of a System Log area on tape. The DDS format provides for three levels of error correction which are referenced as C1, C2, e C3, with C3 being the highest level of error correction, and the System Log area was defined for recording of the number of C3 errors and rewrite errors which occurred during the current use of the cassette. The intent was to provide an indication of tape deterioration as manifested by a significant increase in errors relative to the prior use, and some computer storage DAT drives include the capability to indicate a warning if current use indicates significantly more errors than prior use. However, a warning based on the System Log information as to C3 errors and rewrite errors may be too late to prevent unrecoverable errors. C3 read errors occur only when C1 and C2 processing fail to correct a track (i.e., when there are more than 24 C1 errors in a track). If both C1 and C2 fail to correct, it is likely that many tracks in the vicinity of a defect will be uncorrectable, such that C3 cannot recover the data (C3 corrects only two tracks per group). While the increase in C3 errors shows that a head clog or unrecoverable error occurred, such increase does not provide an effective early warning of a head clog or gradual tape deterioration. The same is true of monitoring the number of rewrites during writing. Rewrites are normally done only if a severe tape defect is detected, and thus do not provide an early warning of a head clog or gradual tape deterioration.

SUMMARY OF THE INVENTION

It would therefore be an advantage to provide for early warning of tape deterioration or tape head clogs that allows preventive measures to be taken.

Another advantage would be to provide for a tape head cleaning procedure performed by the tape drive in the event of the occurrence of an error that could not be corrected by re-reads or re-writes.

The foregoing and other advantages are provided by the raw error monitoring and head self-cleaning procedures of the invention. The raw error monitoring procedures includes the steps of (a) reading a tape, (b) determining for each of successive groups of frames respective A track and B track reference error counts representative of the A track and B track C1 error counts in each group of frames, each group having the same number of frames, and (c) providing a warning signal indicative of diminished or degraded performance if (i) either the A track reference counts for a predetermined number of consecutive frame groups exceed a predetermined threshold or the B track reference counts for a predetermined number of consecutive frame groups exceed a predetermined threshold, or (ii) if both the A track and B track reference counts for the predetermined number of consecutive frame groups exceed the predetermined threshold.

The self-clean procedure is carried out pursuant to the occurrence of an error that could not be corrected by re-reads or re-writes, and includes the steps of moving the tape to the end of the tape at a speed higher than normal, moving the tape to the beginning of the tape at a speed higher than normal, positioning the tape at the location of the error, providing a warning to the user, and resuming the operation that resulted in occurrence of the error. If the error persists, the read or write operation is terminated and the user is notified of the occurrence of an uncorrectable error.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
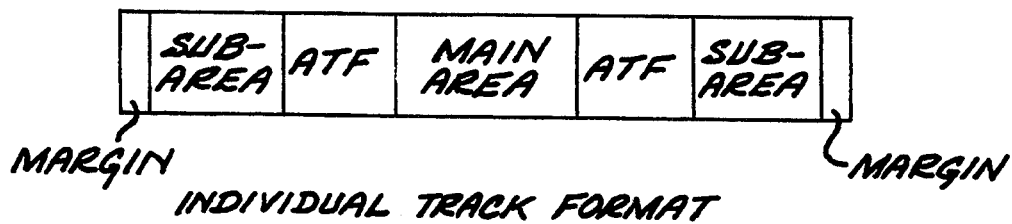
FIG. 1 is a schematic illustration of the different areas on a single track of a DAT tape.

In the following detailed description and in the several figures of the drawing, like elements are identified with like reference numerals.

By way of illustrative example, the disclosed invention can be implemented generally in accordance with the ANSI DDS standard referenced in the background, and the following is based upon conformation with ANSI DDS. However, it should be readily appreciated by persons skilled in the art from reading of the subject disclosure that other computer data storage recording formats can be utilized to implement the invention.

For ease of explanation, some aspects of DDS formatting that are pertinent to the invention will be briefly discussed. DDS formatting organizes data into data groups respectively having 22 or 23 frames, where each frame comprises 2 physical tracks on tape which are commonly designated as A and B tracks.

Referring to FIG. 1, set forth therein by way of illustrative example is a schematic layout of one track of a computer data storage DDS DAT tape. A Main Area, which corresponds to the Main area in DAT audio tapes, stores user data as well as data management information such as the logical Frame Number (LFN) of the frame with which the particular track is associated. The LFN is the logical position of the frame in the associated data group, which can be different from the actual physical location of the frame due to factors such as rewrites. Further, logical frames an be out of sequence because of appends, rewrites, head clogs during write operations, and bad tape areas. DDS formatting supports a read-after-write technique wherein a frame identified as being a bad frame can be rewritten downstream of the bad frame. In particular, the frame can be rewritten after zero, one, two, three, four or five other frames have been written. The subject disclosure takes into account such read-after-write procedures without regard to logical frame numbers.

The tape Subareas store, among other information, the LFN of the associated frame, the Absolute Frame Count (AFC) for the associated frame, a subcode type identifier, a tape area identifier, as well as other information. The AFC represents the actual physical location of a frame in the sequence of frames on a tape.

A data group includes 22 or 23 frames, depending on whether a third level of error correction code (ECC) is utilized with the group, and group boundaries can be indicated by amble frames which have an LFN of 0, by the status of a last frame I.D. bit in the frame header and in the subcode, or by a frame that has an LFN of 1. However, with read-after-write, the last frames in one group could be meshed with the initial frames in the subsequent group, and the procedure for reading groups will need to recognize and properly process this circumstance.

The ATF (automatic track finding) areas contain tracking information utilized for centering the tape heads on the tracks on the tape.

Figure 2:
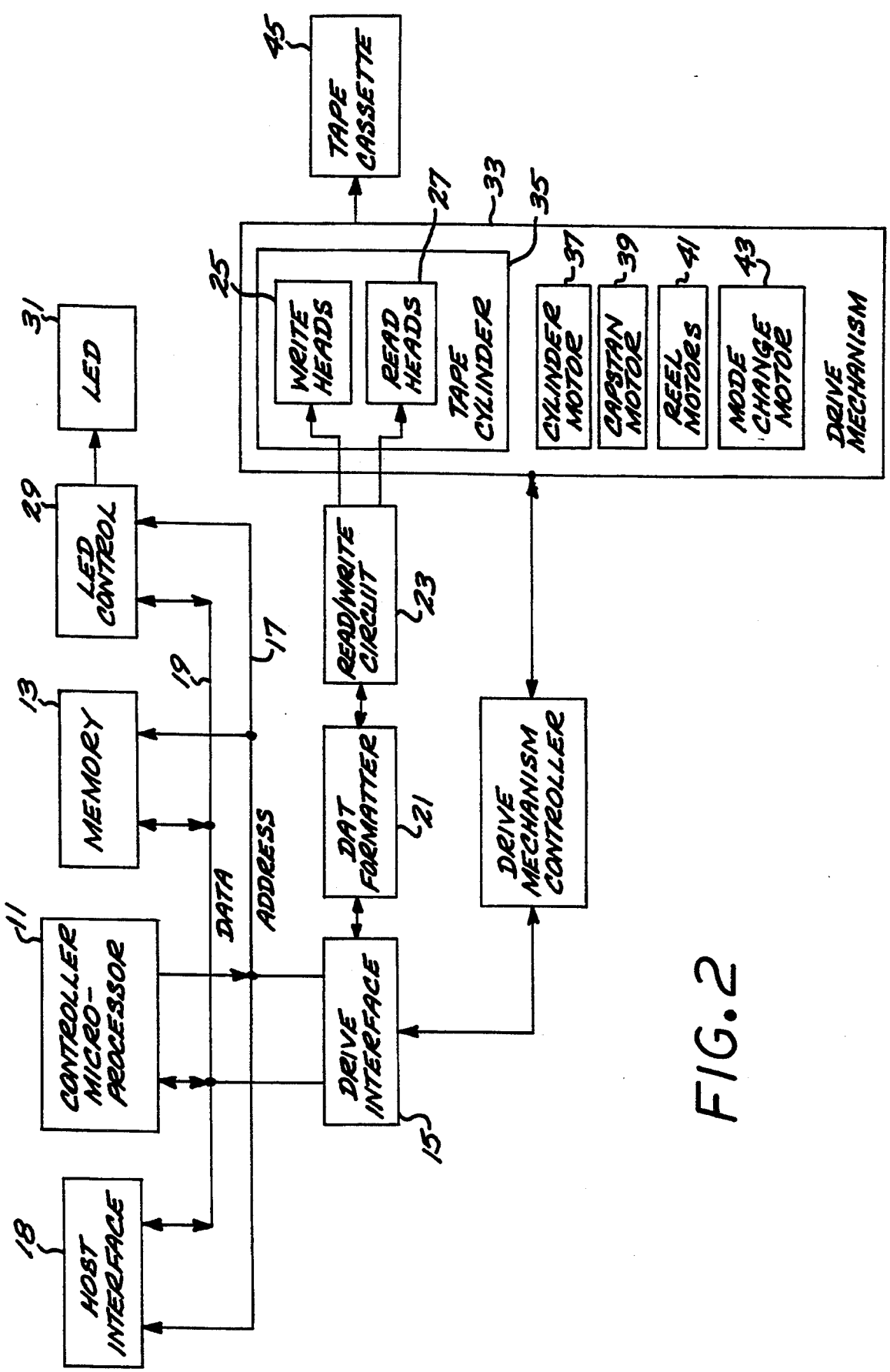
FIG. 2 is a block diagram of the components of a DAT drive with which the subject invention can be implemented.

Referring now to FIG. 2, shown therein is a generalized block diagram of the components of a DAT tape drive system with which a raw error monitoring technique and a tape head self-cleaning procedure can be implemented in accordance with the invention. The tape drive system includes a controller microprocessor 11, a memory 13 which includes random access memory as well as read only memory, a drive interface 15, and a DAT formatter circuit 21. The microprocessor 11 communicates with the memory 13 and the drive interface 15 via an address bus 17 and a data bus 19. A host interface 18 comprising an interface in accordance with the ANSI SCSI standard or an IBM PC bus compatible interface, for example, provides for communication of commands, data blocks, and status information between a host computer and the DAT drive system.

For write operations, the DAT formatter circuit 21 receives Main Area information and Subarea information from the drive interface 15, appropriately formats such information in accordance with the DAT Conference audio standard, and provides the formatted information to the tape drive read/write circuit 23 which provides write signals to A and B write heads 25 which respectively write the A tracks and the B tracks on the tape.

For read operations, DAT formatter circuit receives tape data from the read/write circuit 23 which is responsive to A and B read heads 27 which respectively read the A tracks and the B tracks on the tape. The DAT formatter circuit decomposes the information read from tape in accordance with the DAT Conference audio standards, so as to provide or make available to the drive interface Main Area data, Sub Area data, and C1 error counts resulting from C1 ECC parity checks performed by the DAT formatter circuit on Main Area data and Sub area pack data. By way of illustrative example, such C1 error counts are provided for each track.

The tape drive further includes a front panel LED 31 which is driven by an LED control circuit 29 that is controlled by the microprocessor 11.

The write heads 25 and the read heads 27 are contained in a drive mechanism 33 which includes standard DAT tape drive mechanical components such as a tape cylinder 35 for supporting the write heads 25 and read heads 27, a cylinder motor 37, a capstan motor 39, reel motors 41, and a mode change motor 43. The drive mechanism 33 controls the movement of the tape contained in a DAT cassette 45, and its operation is controlled by a drive mechanism controller 35 which is controlled by the microprocessor 11 via the drive interface 15.

By way of illustrative example, the tape drive components of FIG. 1 can be implemented in accordance with the DAT drive system disclosed in commonly assigned U.S. application Ser. No. 07/465,726, filed Jan. 17, 1990, for DAT DRIVE/CONTROLLER INTERFACE, incorporated herein by reference.

In accordance with the invention, the C1 error rates for respective A and B tracks are monitored during read and read-after write operations (i.e., the A tracks are monitored separately from the B tracks), and if the error rate for either of the A or B tracks indicates degraded performance, a warning is activated so as to provide to the user an indication of degraded performance, which typically is due to a worn tape or a clogged head. The warning can be the flashing of the LED 31 which continues until tape ejection and/or a message communicated via the host computer interface for display on the host computer video display. A significant consideration for providing a warning that includes at least the flashing LED is that the flashing LED should get the attention of the user when he or she is ejecting the tape.

The C1 error count is a very sensitive indicator of overall read performance. The number of C1 errors is normally relatively low (e.g., about 5 in 10,000 blocks), and becomes much higher when the tape is worn or when there is a problem with the drive such as a clogged head. If the C1 error count becomes very high (e.g., greater than 5 in 100 blocks), the overall correction limit of the three levels of ECC correction is being approached, and uncorrectable data errors could result. Pursuant to the invention, a C1 error count threshold is selected such that degraded performance is indicated when (a) the C1 error count threshold is exceeded by the average C1 error count for the A tracks for a predetermined number of consecutive samples, or (b) the C1 error count threshold is exceeded by the average C1 error count for the B tracks for a predetermined number of consecutive samples, where a sample comprises a large number of tracks. When either condition is detected, a warning (flashing LED and/or display message) is provided to the user indicating that drive performance is degrading and that it may be due to a clogged head. When both conditions are detected, a non-specific warning is provided to the user indicating that drive performance is degrading, that it may be due to clogged heads or a worn tape, and that continued operation is subject to a diminished error correction margin, but some error correction margin still remains so as to allow for copying of the tape if the cause of the degraded performance is a worn or degraded tape.

By way of illustrative example, each of the A track samples and B track samples comprises 39 tracks; and corresponding A track and B track samples are assembled for every 39 frames. Further by way of illustrative example, the number of consecutive samples that must exceed the C1 error count threshold is 10 track samples, and the C1 error count threshold for a 39 track sample is 50, where only the Main Area C1 error counts are being monitored, since the Main Area C1 error count for any give track is representative of the total C1 error count for that track. The threshold of 50 C1 errors per 39 tracks provides for a threshold rate of 50 block errors in 4992 data blocks.

It should be appreciated that the representative track C1 error counts can alternatively be provided by (i) the respective C1 error counts for the Sub areas of the A and B tracks, or (ii) the sum of the C1 error counts for the Main and Sub areas of the track A and the sum of the C1 error counts for the Main and Sub areas of the track B.

The threshold error rate, which for example can be specified via the host computer or can be fixed, may be in a range of acceptable values and should be selected such that a first guardband exists between an "ideal" error rate and the threshold, and a second guardband exists between the threshold and the limits of C1, C2 and C3 correction capability. One requirement of the threshold value is that it should not be exceeded by drives and tapes that are operating normally. The threshold value that meets this requirement can be determined by characterizing a population of drive units and tapes, and can vary from one drive product to another. Within a range of acceptable threshold values, the threshold may be selected to result in more or less sensitivity to degraded performance. As sensitivity is increased (threshold is decreased), the guardband between the threshold and the limits of C1, C2, and C3 correction capability is increased, and the warnings will be more frequent. As sensitivity is decreased (threshold is increased), the guardband between the threshold and the limits of C1, C2, and C3 correction capability is decreased, and the warnings will be less frequent.

The use of a large number of tracks sample, which effectively averages the error rate over many tracks, and the requirement that C1 error counts for a predetermined number of consecutive samples of a given track A or B must exceed the threshold are intended to prevent false triggering in the presence of localized tape damage (such as a vertical crease or other defect). Thus, temporary increases in error rate, which may be due to localized damage and which may be appropriately handled by ECC processing or retries, are ignored. The intent of the C1 error monitoring is to respond to extended tape damage such as gradual deterioration due to use.

The degraded performance warning provided in accordance with the invention is provided even if no re-tries or C3 corrections are needed, and thus is an early warning of degraded operation that is provided before the other correction mechanisms (C1, C2, C3, re-tries) are exhausted.

Figure 3:
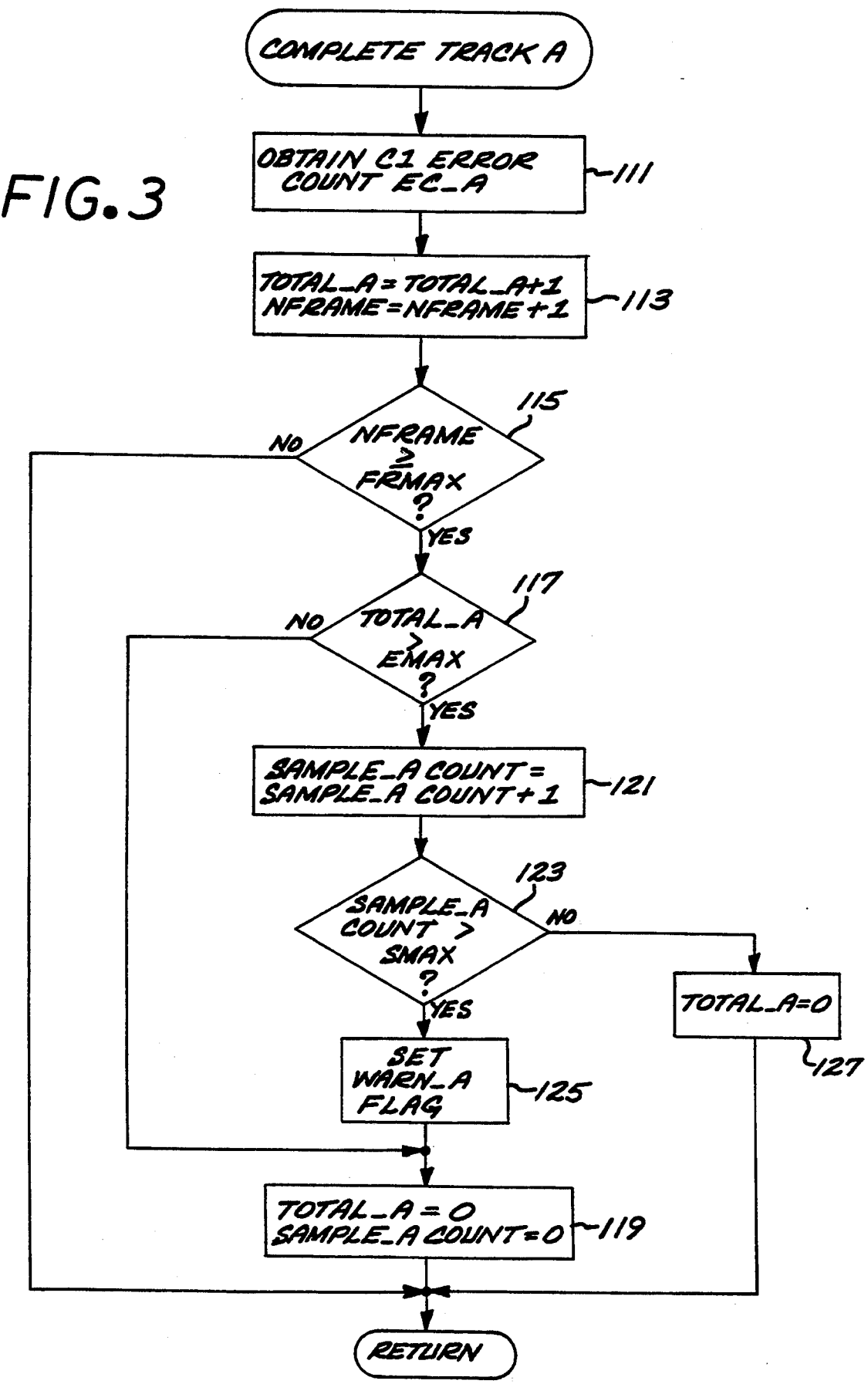
FIGS. 3 and 4 are flow diagrams of procedures performed by the tape drive of FIG. 2 for monitoring raw errors in accordance with the invention.
Figure 4:
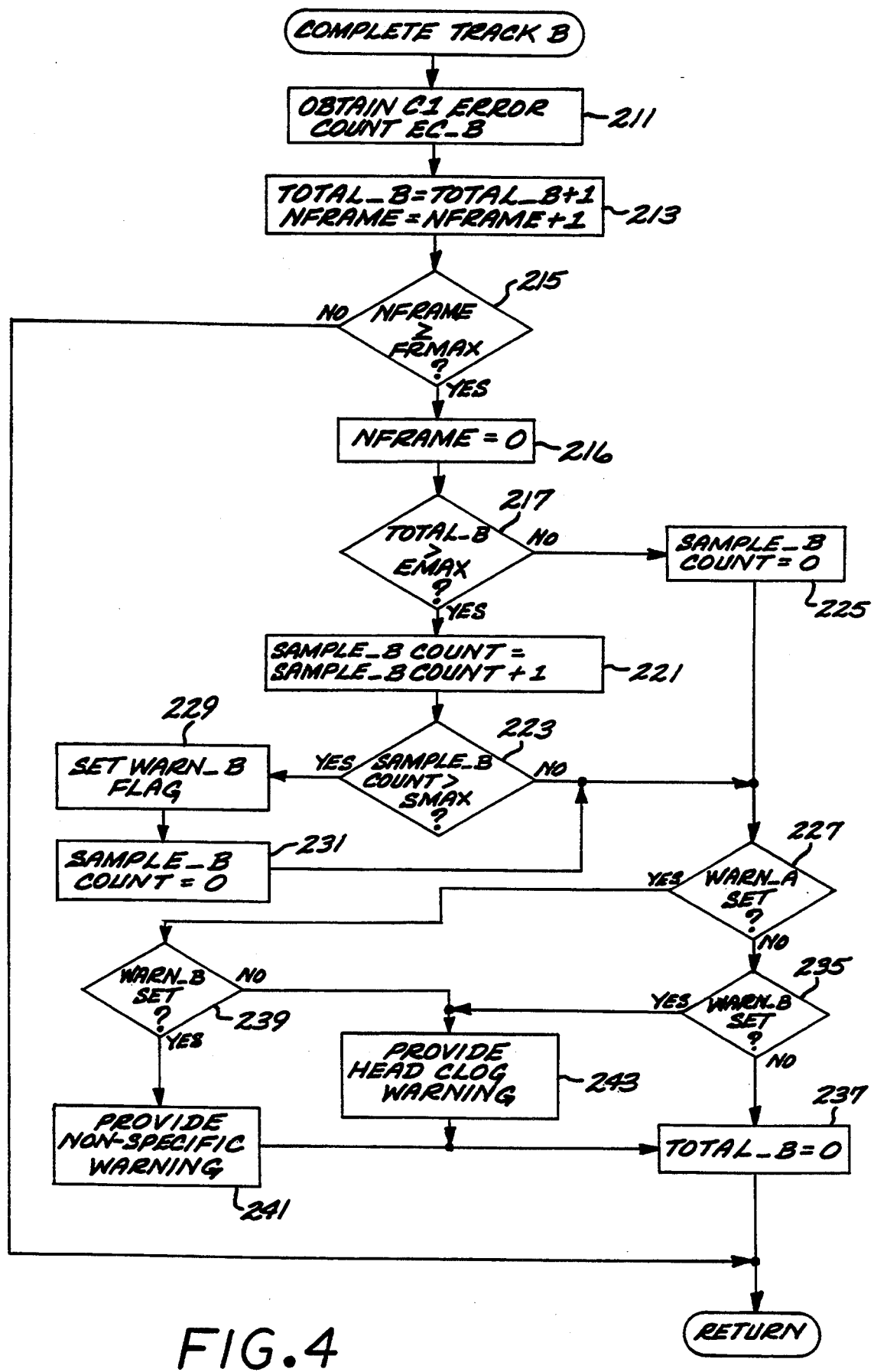

FIGS. 3 and 4 set forth procedures carried out by the tape drive in accordance with the invention for monitoring the C1 error rates for tracks A and B of every frame. These procedures are based the C1 error count for the Main area of the track A being available prior to the C1 error count for the Main area of the associated track B. These procedures utilize variables TOTAL_A, TOTAL_B, NFRAME, SAMPLE_A COUNT, and SAMPLE_B COUNT which are initialized to 0 at power-up or reset of the tape drive. NFRAME is utilized as a counter for tracking the number of tracks in the present sample, each frame providing an A track error count for the current A track sample and a B track error count for the current B track sample. TOTAL_A and TOTAL_B respectively contain the accumulated representative C1 error counts for the present track A and track B samples. SAMPLE_A COUNT and SAMPLE_B COUNT respectively contain the number of consecutive track A and track B samples whose TOTAL_As and TOTAL_Bs exceeded the predetermined error count threshold which is stored in EMAX. The representative sample C1 error counts TOTAL_A and TOTAL_B are accumulated from respective error counts EC_A and EC_B which are representative of the error counts for the tracks A and B of a frame and are provided, for example, by the respective C1 error counts for the Main areas of the A and B tracks of the present frame whose error counts are being added to the present A track and B track samples.

Referring to FIG. 3, set forth therein is a procedure that is called each time the reading of a Track A is completed. At 111 the representative track C1 error count EC_A for the A track of a frame are obtained from the DAT formatter circuit, for example pursuant to appropriate timing as to the availability of the error count information for a frame that has been read from tape. At 113 the representative track C1 error count EC_A is added to TOTAL_A, and NFRAME is incremented by one. At 115 a determination is made as to whether the number of frames NFRAME contributing to the present Track A sample is equal to or greater than the predetermined number of frames FRMAX that contribute to a Track A sample. If no, the procedure returns.

If the determination at 115 is yes, NFRAME is equal to or greater than the predetermined number of frames FRMAX that contribute to a Track_A sample, a determination is made at 117 as to whether TOTAL_A for the completed Track A sample is greater than an error count threshold EMAX. If no, at 119 the variables TOTAL_A and SAMPLE_A COUNT are both set to zero, and the procedure returns.

If the determination at 117 is yes, TOTAL_A for the completed Track_A sample is greater than the error count threshold EMAX, at 121 SAMPLE_A COUNT is incremented by one. At 123 a determination is made as to whether SAMPLE_A COUNT is greater than a predetermined sample count maximum SMAX which is the number of consecutive excessive error count samples required to provide a message to the user as more fully set forth in tile procedure of FIG. 4. If yes, at 125 a WARN_A flag is set, and control transfers to 119. If the determination at 123 is no, SAMPLE_A COUNT is not greater than SMAX, at 127 TOTAL_A is set to zero and the procedure returns.

Referring now to FIG. 4, set forth therein is a procedure that is called at the completion of reading the Track B that is associated with the Track A whose C1 error count was processed in accordance with the procedure of FIG. 3. At 211 the representative track C1 error count EC_B for the track B is obtained from the DAT formatter circuit, for example pursuant to appropriate timing as to the availability of the error count information for a frame that has been read from tape. At 213 the representative track C1 error count EC_B is added to TOTAL_B. At 215 a determination is made as to whether the number of frames NFRAME contributing to the present Track B sample is equal to or greater than the predetermined number of frames FRMAX that contribute to a Track B sample. If no, the procedure returns.

If the determination at 215 is yes, the number of frames contributing to the present Track B sample is equal to or greater than the predetermined number of frames FRMAX in a sample, NFRAME is set to 0 at 216. At 217 a determination is made as to whether the error count TOTAL_B of the Track B sample is greater than the error count threshold EMAX. If no, SAMPLE_B COUNT is set to zero at 225, and control transfers to the determination at 227.

If the determination at 217 is yes, the sample error count TOTAL_B is greater than the error count threshold EMAX, the sample count SAMPLE_B COUNT is incremented by one at 221, and at 223 a determination is made as to whether SAMPLE_B COUNT is greater than the predetermined sample count maximum SMAX. If yes, at 229 a WARN_B flag is set, and at 231 SAMPLE—B COUNT is set to zero. Control then transfers to the determination at 227.

At 227, a determination is made as to whether the WARN_A flag is set. If no, a determination is made at 235 as to whether the WARN_B flag is set. If no, at 237 the error count TOTAL_B is set to zero and the procedure returns.

If the determination at 227 is yes, the WARN_A flag is set, at 239 a determination is made as to whether the WARN_B flag is set. If yes, at 241 a non-specific warning is provided to user indicating that degraded performance has been detected both the A tracks and the B tracks. Control then transfers to 237.

If the determination at 235 is yes, the WARN_B flag is set, at 243 a specific warning is provided to the user indicating that degraded performance in only the A tracks or only the B tracks has been detected that a head clog is the likely cause of the degraded performance. Control then transfers to 237.

If the determination at 239 is no, the WARN_B flag is not set, at 243 the non-specific warning is provided to indicate that degraded performance in only the A tracks or only the B tracks has been detected and that a head clog is the likely cause of the degraded performance. Control then transfers to 237.

Pursuant to the foregoing procedures, corresponding track A and Track B samples will be calculated from the sample FRMAX frames, and a head clog warning is provided if the C1 excessive C1 error condition is met by SMAX consecutive track A samples or by SMAX consecutive track B samples, but not both. If the C1 excessive error condition is met by SMAX consecutive samples of both tracks for the same SMAX frames, then a non-specific warning is provided. The rationale for providing different warnings is that if only the A tracks or the B tracks, but not both, have degraded performance, the cause is most likely a clogged head.

The specific warning can be provided for example by setting the LED to flash at a slow rate and/or by providing for display of a message on the host computer display that degraded performance has been detected and that the cause of the degraded performance is likely to be a clogged head.

The non-specific warning can be provided for example by setting the LED to flash a medium rate that is perceptibly faster than the LED flash rate for the specific warning and/or by providing for display of a message on the host computer display that degraded performance has been detected. Such message can also indicate that the degraded performance has been detected as to both A and B tracks.

Pursuant to the specific warning provided by the flashing LED and/or display message for a particular tape cassette, the user should clean the tape heads after the current operation. Since the warning provided will initially be in advance of reaching the tape drive error correction limit, the current operation does not have to be aborted. If the warning persists upon the next use of the tape after head cleaning, the cassette should be considered marginal and should be replaced. By replacing the cassette, for example by copying the data to another cassette, uncorrectable errors may be avoided. An uncorrectable error that is not preceded by a raw error monitor warning is not likely to occur, and if it does, drive failure may be suspected. Sudden head clog may cause an unrecoverable error that is not preceded by a warning, but is unlikely.

Pursuant to a non-specific warning provided by the flashing LED and/or display message for a particular tape cassette, the user should also clean the tape heads after the current operation. Since the warning provided will initially be in advance of reaching the tape drive error correction limit, the current operation does not have to be aborted. If the warning persists upon the next use of the tape after head cleaning, the cassette should be considered marginal and should be replaced.

Despite the early warning of degraded performance provided by the foregoing raw error monitoring procedure, a user might not take preventive measures in response to the early warning, and the possibility of uncorrectable error increases with usage time after the early warning. In a read operation, an error is considered uncorrectable if it cannot be corrected by a predetermined number of re-reads, where a re-read is performed if ECC cannot correct the error. In a write operation, an error is considered uncorrectable if data cannot be satisfactorily written by a predetermined number of re-writes. By way of illustrative example, an uncorrectable error occurs when 8 re-reads cannot correct read data, and also when 128 re-writes do not result in a successful writing of data. Permanent head clog is one of the possible causes of uncorrectable error, and the invention further contemplates a head cleaning procedure that is automatically executed when an uncorrectable error occurs. It is noted that a temporary head clog causes a transient error which by virtue of its transient nature is ignored by the raw error monitoring procedure.

Permanent head clog may be caused by magnetic dust accumulation in the area of one or more read/write heads, or may be caused by magnetic dust accumulation on the stationary portion of the cylinder assembly. In the latter case, the tape may be lifted off the heads such that read/write is marginal on one or more heads. As magnetic dust accumulates, the C1 error rate can gradually increase until the C1 error count threshold of the previously described raw data monitoring procedure is exceeded. Further increase in dust build up can result in an uncorrectable error, and the self cleaning procedure attempts to recover from excessive build-up of magnetic dust in the event head cleaning is not performed when the early warning is indicated. The self-cleaning comprises a high-speed (e.g., X300) end-to-end tape shuttle operation in both directions which will often remove magnetic dust deposits, at least to permit better than marginal read/write operation of the heads. It is noted that in severe cases of head clog, manual head cleaning may still be required in order to read or write the tape. After the end-to-end shuttle operation, a warning is provided and operation continues normally if the self-clean is successful, with the warning continuing as in the C1 error monitoring procedure. If the self-clean procedure is not successful in correcting the error, current read or write operation that encountered the error is terminated and the user is notified of the occurrence of an uncorrectable error.

Figure 5:
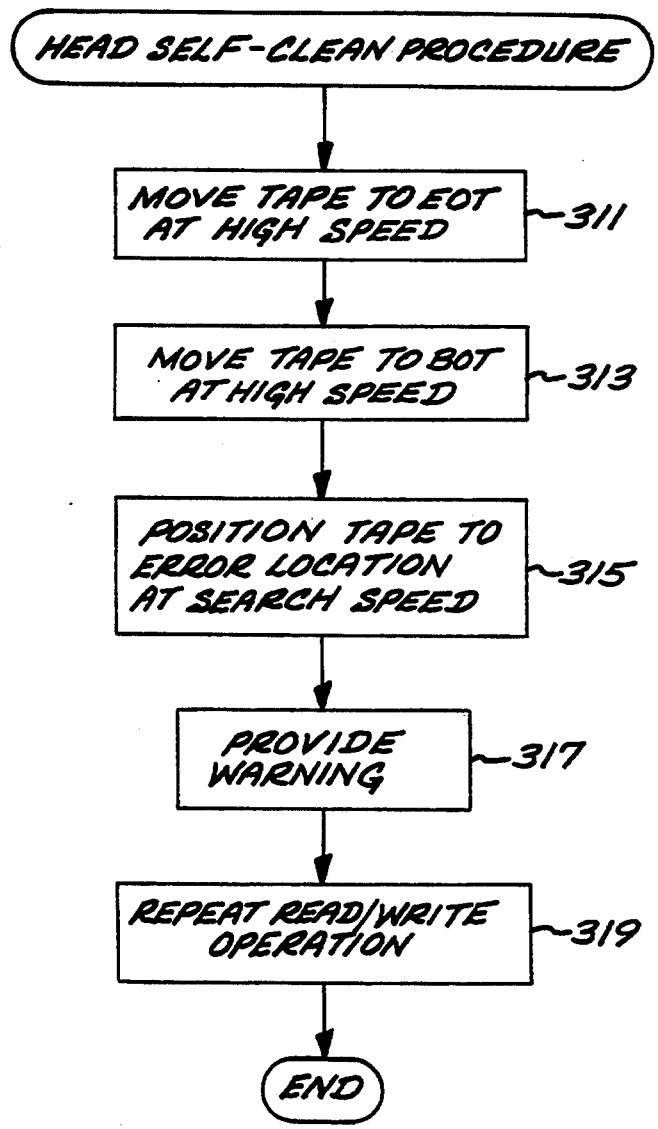
FIG. 5 is a flow diagram of a tape head self-cleaning procedure performed by the tape drive of FIG. 2 in accordance with the invention.

Referring in particular to FIG. 5, set forth therein is a flow diagram of a head cleaning procedure that is executed pursuant to an error cannot be corrected by ECC coupled with re-reads or by re-writes. At 311 the tape is moved to the End Of Tape at a high speed such as X300 (300 times normal speed). At 313 the tape is moved to the Beginning Of Tape at the high speed such as X300. At 315 the tape is re-positioned to the location of the uncorrectable error at search speed. At 317 a warning is provided to the user, and at 319 the failed operation (i.e., read, or write followed by read after write) is repeated.

The warning provided at 317 can be a continuation or repetition of a warning that may have been provided pursuant to the raw error monitoring procedure. If a warning was not present pursuant to the raw error monitoring procedure, the warning at 317 can comprise, for example, flashing of the LED at the same slow rate as used for the specific warning of the raw error monitoring and/or a displayed message indicating that a sudden head clog occurred and was removed.

If the self-clean procedure is successful in correcting the error that caused activation of the procedure, operation continues normally and the warning provided at 317 is not changed. However, if the self-clean procedure is not successful in correcting the error, the read or write operation that caused the error is terminated and the user is notified of an uncorrectable error, for example by setting the LED to flash rapidly at a rate higher than the medium LED flash rate utilized for a non-specific warning pursuant to the raw error monitoring procedure, and/or by a message on the host computer video display.

It should be appreciated that the step of providing a warning at 317 can be interchanged with the step of continuing operation at 319, in which case the warning would be provided if the self-clean procedure is successful at correcting the error. If the self-clean procedure is not successful in correcting the error, the read or write operation that caused the error is terminated and the user is notified of an uncorrectable error, as discussed previously.

Pursuant to the warning provided by the self-clean procedure, the user should take the same preventive measures as with the warnings provided by the raw error monitoring procedure. The tape heads should be manually cleaned after the current operation. If a warning again occurs when the tape is next used after head cleaning, the cassette should be considered marginal and should be replaced. By replacing the cassette, for example by copying the data to another cassette, it will be possible to avoid errors that cannot be corrected by re-reads and head self-cleaning, or by re-writes and head self-cleaning.

While the self-cleaning procedure has been discussed in the context of the raw data monitoring procedure, it should be appreciated that the self-cleaning procedure can be implemented without the raw data monitoring procedure. The self-cleaning procedure can be considered as a further level of error correction that is activated when an error cannot be corrected by re-reads or by re-writes.

Referring again the to raw error monitoring procedure, that procedure can be utilized for manufacturing testing of DAT drives. Activation of the warning when a drive is operating with a known good tape and with clean heads indicates a problem with the drive.

The foregoing has been a disclosure raw error monitoring procedure that advantageously provides an early warning of a deteriorating tape or a head clog, which allows the user to take preventive measures before valuable data is lost. The raw error monitoring procedure further encourages the user to use good tapes and to maintain the tape heads, and also provides the user with confidence that tapes the error rates are well within the error correction capabilities of the drive. The self-clean procedure advantageously provides an additional layer of error correction capability that attempts to avoid the necessity of interrupting a current operation to clean tape heads, and also encourages maintaining the tape heads.

Although the foregoing has been a description and illustration of specific embodiments of the invention, various modifications and changes thereto can be made by persons skilled in the art without departing from the scope and spirit of the invention as defined by the following claims.

What is claimed is:

1. A process for cleaning the tape heads of a DAT drive pursuant to the occurrence of an error during a data read or write operation, where the error is one that could not be corrected by alternated re-reads or re-writes of a corresponding, desired section of an engaged tape, said tape having a predefined length with first and second end portions, said read or write operation each having a normal tape speed associated therewith, said method comprising the sequential steps of:

(a) first moving the engaged tape relative to the tape heads at a speed higher than the normal read or write speed, so as to pass the length of engaged tape from the desired section to the first end of tape portion across the heads at said higher speed;

(b) second moving the engaged tape relative to the tape heads at said higher-than normal speed so as to pass the length of engaged tape from the first end of tape portion to the second end of tape portion across the heads at said higher speed:

(c) third moving the engaged tape relative to the tape heads so as to place the heads over the desired tape section; and d) after said third moving step, repeating the operation that resulted in occurrence of the error.

2. The process of claim 1 wherein said higher speed is 300 times one of the normal read and write speeds.

3. The process of claim 1 wherein the third step of moving the tape so as to place the heads at the location of the error includes the step of moving the tape at a search speed that is faster than normal read speed.

4. A process for cleaning the tape heads of a DAT drive pursuant to the occurrence of an error during a data read or write operation, where the error is one that could not be corrected by attempted re-reads or re-writes of a corresponding, desired section of an engaged tape, said tape having a predefined length with first and second end portions, said read or write operation each having a normal tape speed associated therewith, said method comprising the steps of:

(a) moving the engaged tape in a first direction to the first end portion of the tape at a speed higher than the normal read or write speed;

(b) moving the engaged tape in a second direction that is opposite the first direction to the second end portion of the tape at a speed higher than the normal read or write speed; and (c) after said steps (a) and (b) of moving the tape in opposed first and second directions, moving the engaged tape relative to the tape heads so as to place the heads over the desired tape section.

5. The process of claim 4 wherein the step (a) of moving the tape in said first direction includes moving the tape at 300 times one of the normal read and write speeds.

6. The process of claim 4 wherein the step (b) of moving the tape in said second direction includes moving the tape at 300 times one of the normal read and write speeds.

7. The process of claim 4 wherein the step (c) of placing the heads over the desired tape section includes moving the tape at a search speed that is faster than normal read speed.

8. A process for cleaning the tape heads of a DAT drive pursuant to the occurrence of an error during a data read or write operation, where the error is one that could not be corrected by attempted re-reads or re-writes of a corresponding, desired section of an engaged tape, said tape having a predefined length with first and second end portions, said read or write operation each having a normal tape speed associated therewith, said method comprising the steps of:

(a) moving the tape to the first end portion of the tape at a speed that is at least 300 times the normal read speed;

(b) moving the tape to the second end portion of the tape at a speed that is at least 300 times the normal read speed;

(c) after said steps (a) and (b) of moving the tape in opposed first and second directions, moving the engaged tape relative to the tape heads so as to place the heads over the desired tape section; and (d) after said step (c) of placing the heads over the desired tape section, repeating the operation that resulted in occurrence of the error.

9. A method for removing accumulated debris from one or both of tape read and write heads of a DAT drive, where the accumulation of said debris tends to separate an engaged tape having a predefined length from one or both of said read and write tape heads and to thereby induce errors in corresponding read and/or write operations, said operations being ones wherein digital data is to be transferred between the engaged tape and a corresponding one or both of said read and write tape heads, said method comprising the steps of:

(a) while said tape is engaged against the accumulated debris, firstly moving a substantial length of the tape in a first direction past the debris at a sufficiently high speed to remove at least part of the accumulated debris; and (b) while said tape is engaged against the accumulated debris, secondly moving a substantial length of the tape in an second direction, opposed to the first direction, past the debris at a sufficiently high speed to remove at least part of the accumulated debris.

10. A debris removing method according to claim 9 wherein the recited substantial lengths of the first and second movings of the tape add up to at least the predefined length of the tape.

11. A debris removing method according to claim 9 wherein the first and second movings of the tape are carried out automatically, one after the next.

12. A debris removing method according to claim 11 wherein the first and second movings of the tape are preceded by the step of detecting an uncorrectable error condition, said uncorrectable error condition arising from an inability to correctly read from or write to a given section of the tape after a predetermined number of consecutive attempts; and wherein the first and second movings of the tape are carried out automatically after said uncorrectable error condition is detected.

13. A debris removing method according to claim 12 wherein the first and second movings of the tape are followed by the step of:

(c) automatically moving the tape a third time relative to the tape heads so as to place the heads over the given section of the tape where the unrecoverable error condition was detected.

* * * * *

UNITED STATES PATENT AND TRADEMARK OFFICE
CERTIFICATE OF CORRECTION

PATENT NO. : 5,381,292

DATED : January 10, 1995

INVENTOR(S) : Robert C. Richmond

It is certified that error appears in the above-identified patent and that said Letters Patent is hereby corrected as shown below:

```
Column 1, line 61, "e C3," should be --C3,--.
Column 7, line 5, "Track_A" should be --Track A--.
Column 7, line 12, "Track_A" should be --Track A--.
Column 7, line 19, "tile" should be --the--.
Column 11, line 1, "alternated" should be --attempted--.
```

Signed and Sealed this

Fifth Day of September, 1995

Attest:

BRUCE LEHMAN

*Attesting Officer*  *Commissioner of Patents and Trademarks*